No. 753,730. Patented March 1, 1904.

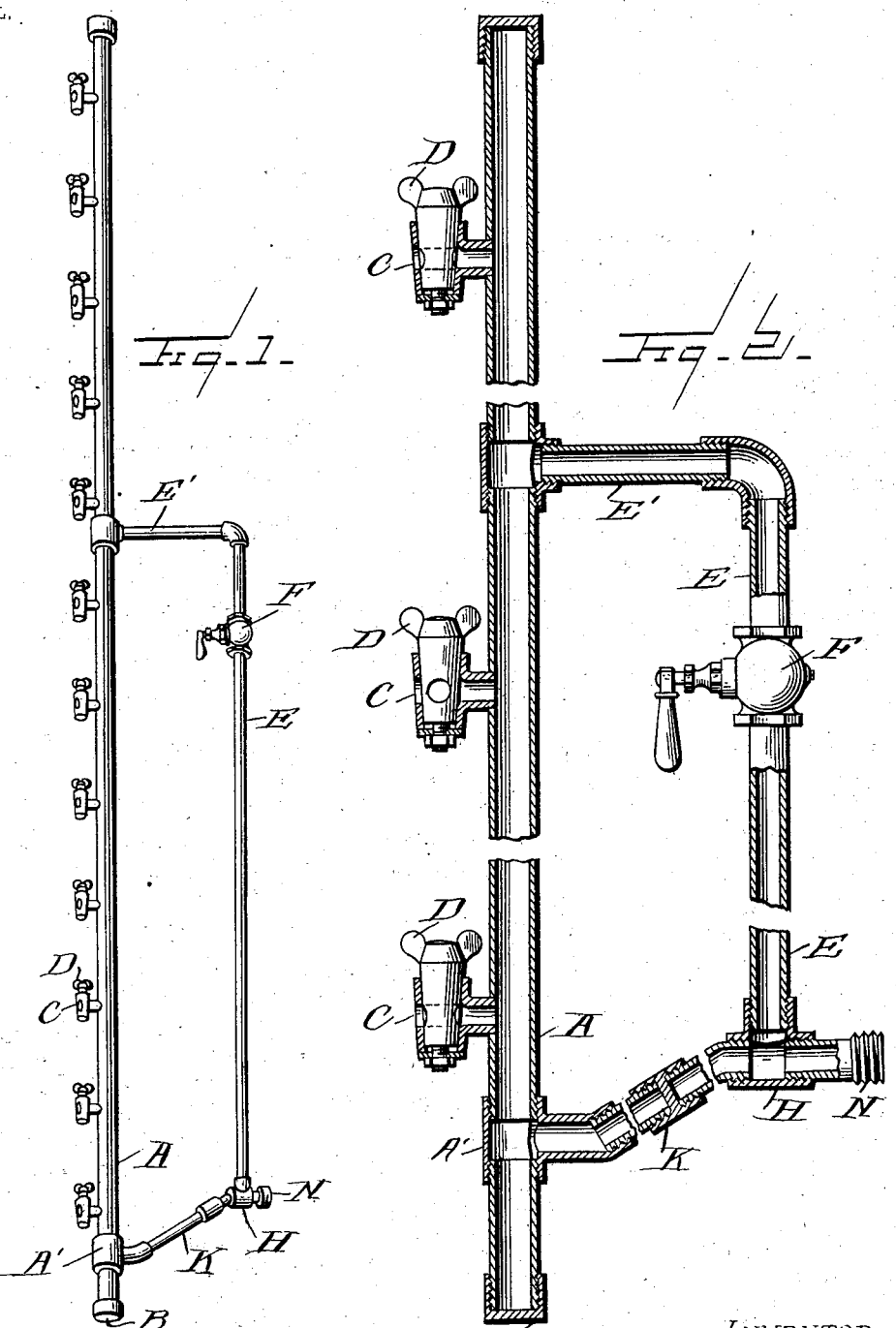

UNITED STATES PATENT OFFICE.

WILLIS H. OWEN, OF CATAWBA ISLAND, OHIO.

SPRAYING-SPAR.

SPECIFICATION forming part of Letters Patent No. 753,730, dated March 1, 1904.

Application filed December 22, 1903. Serial No. 186,213. (No model.)

*To all whom it may concern:*

Be it known that I, WILLIS H. OWEN, a citizen of the United States, residing at Catawba Island, in the county of Ottawa and State of Ohio, have invented certain new and useful Improvements in Spraying-Spars; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in spraying apparatus; and the object of the invention is to produce a simple and efficient device comprising a hollow tube or spar which may be of any length and comprises a series of nozzles at intervals and having a suitable branching pipe carrying a valve whereby the feeding of the liquid being sprayed may be regulated, said branching pipe affording convenient means, as a handle, by which the tubular portion of the apparatus carrying the nozzles may be conveniently operated and brought into convenient positions for spraying trees or shrubbery of different heights.

The invention consists, further, in various details of construction and in combinations and arrangements of parts, which will be hereinafter fully described and then specifically defined in the appended claim.

I illustrate my invention in the accompanying drawings, which, with the letters of reference marked thereon, form a part of this application and in which drawings similar letters of reference indicate like parts in the views, in which—

Figure 1 is a side elevation of my improved spraying apparatus, and Fig. 2 is a vertical sectional view through the same.

Reference now being had to the details of the drawings by letter, A designates a pipe which may be of any suitable length, having plugged or closed ends B. Said pipe is perforated at intervals along its length adapted to receive the shank portions of the nozzles C, which are controlled by valves D, whereby one or any number of the nozzles may be brought into play.

E designates a branching pipe which has communication at its upper end with the pipe A through the right-angled portion E', and a valve F, preferably of quick-acting construction, is positioned at any convenient location, preferably near the upper end of the pipe E, and controls the flow of the liquid or gaseous material which is fed through into the pipe A. The lower end of the pipe E is connected to a union H, which has a pipe K connecting the same with a union A' near the lower end of the pipe A. Said pipe K is provided with a plug or partition K', as shown in the sectional view of the drawings, for the purpose of preventing the flow of the spraying material into the lower end of the pipe A. A pipe connection N is provided for attachment to a hose adapted to lead to a supply-tank or pump and through which the spraying material may be fed to the pipe E preparatory to its being forced through into the pipe A and out through the nozzles.

By the provision of an apparatus embodying the features of my invention and which may be used for compressed air or in connection with a spraying-pump the various parts of trees may be conveniently reached, and the branching pipe affords a means whereby the device may be conveniently handled.

While I have shown a particular construction of apparatus embodying the features of my invention, it will be understood that, if desired, various shapes of branching pipes and nozzles may be employed and the device altered in various details, if desired, without in any way departing from the spirit of the invention.

Having thus fully described my invention, what I claim as new, and desire to secure by Letters Patent, is—

A portable spraying apparatus comprising a pipe, caps over the ends of said pipe, a series of branching valve-carrying pipes, a series of T-shaped nozzles projecting from and communicating with said pipes, valve-plugs mounted in said nozzles, branching pipes projecting from said nozzle-carrying pipes, and a valve-containing pipe connecting and communicating with said branching pipes, as shown and described.

In testimony whereof I hereunto affix my signature in presence of two witnesses.

WILLIS H. OWEN.

Witnesses:
FANNIE S. GAMBLE,
ROSE E. GAMBLE.